No. 851,874.   PATENTED APR. 30, 1907.
C. FERO, Jr.
AUTOMATIC CAR BRAKE.
APPLICATION FILED OCT. 8, 1906.

2 SHEETS—SHEET 1.

Witnesses

Inventor
Charles Fero, Jr.
by H. C. Willson & Co.
Attorneys

No. 851,874. PATENTED APR. 30, 1907.
C. FERO, Jr.
AUTOMATIC CAR BRAKE.
APPLICATION FILED OCT. 8, 1906.
2 SHEETS—SHEET 2.
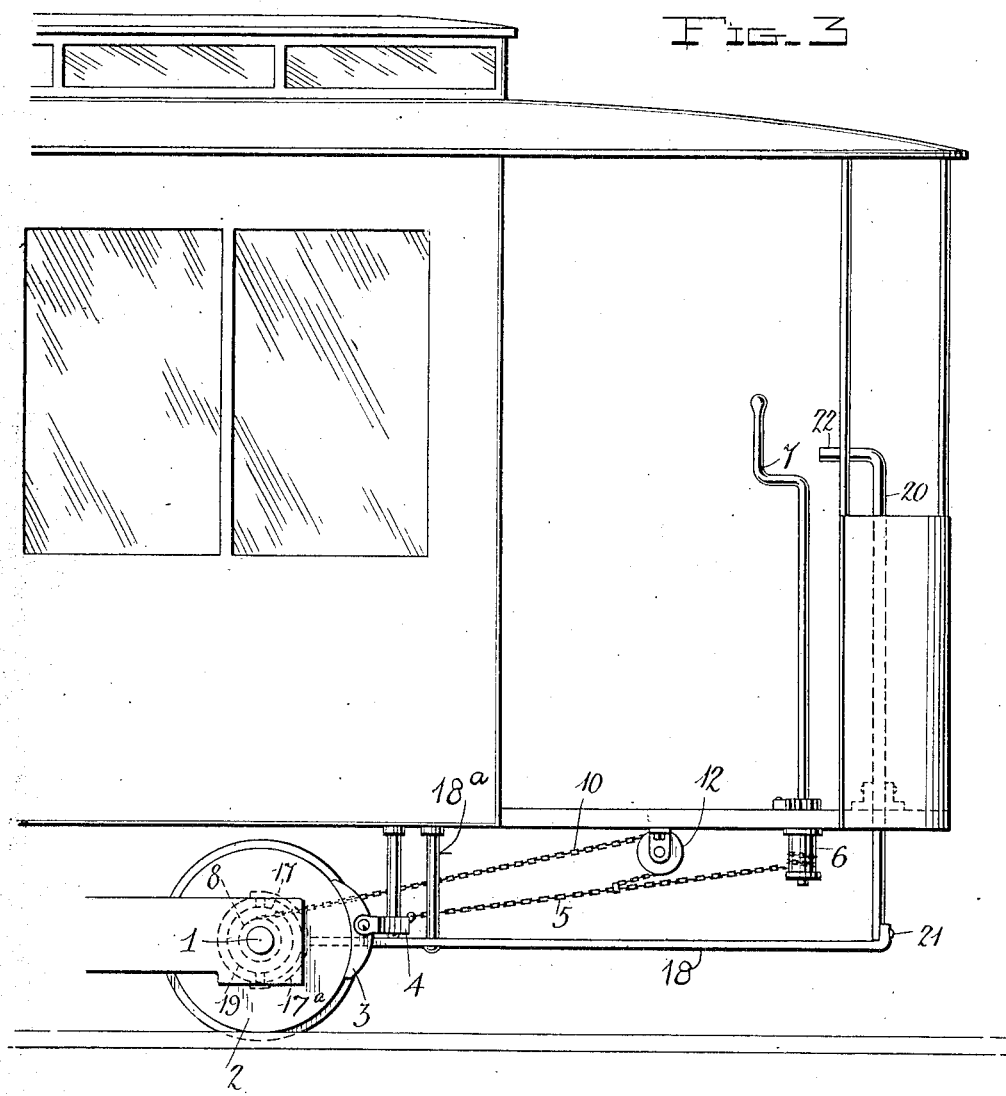

UNITED STATES PATENT OFFICE.

CHARLES FERO, JR., OF BAY CITY, MICHIGAN, ASSIGNOR OF ONE-THIRD TO FRANK THOMPSON, OF BAY CITY, MICHIGAN.

AUTOMATIC CAR-BRAKE.

No. 851,874.      Specification of Letters Patent.      Patented April 30, 1907.

Application filed October 8, 1906. Serial No. 338,041.

*To all whom it may concern:*

Be it known that I, CHARLES FERO, Jr., a citizen of the United States, residing at Bay City, in the county of Bay and State of Michigan, have invented certain new and useful Improvements in Automatic Car-Brakes; and I do declare the following to be a full, clear, and exact description of the invention, such as will enable others skilled in the art to which it appertains to make and use the same.

This invention relates to improvements in automatically operated car brakes.

The object of the invention is to provide an automatically operated car brake mechanism adapted to be used in connection with the ordinary brake applying devices on the car, whereby the movement of the car is applied to operate the brakes.

With the above and other objects in view, the invention consists of certain novel features of construction, combination and arrangement of parts, as will be hereinafter described and claimed.

Figure 1:
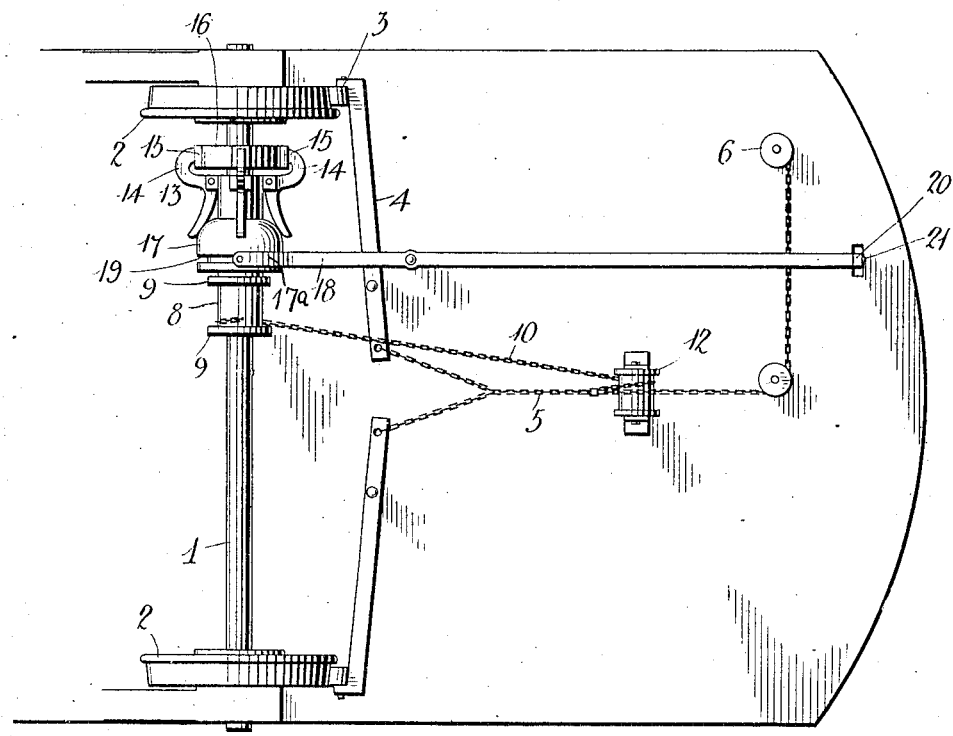
Figure 2:
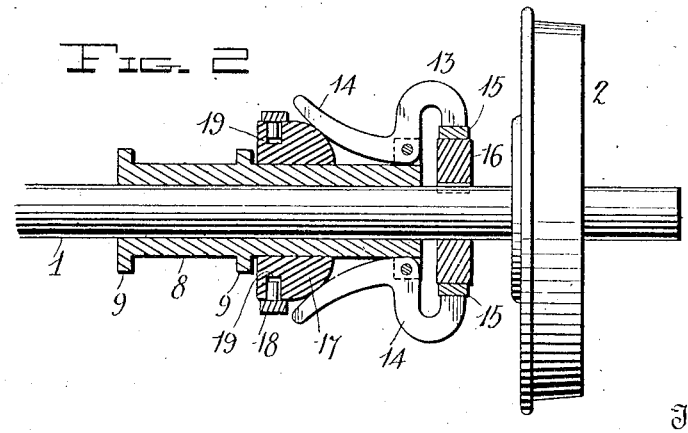

In the accompanying drawings:—Figure 1 is a plan view of a portion of a car, showing the application of the invention thereto; Fig. 2 is a side view of one end of one of the car axles, showing the operating parts thereon in section; and Fig. 3 is a side elevation of one end of a car, showing the arrangement of the brake operating levers and chains.

Referring more particularly to the drawings, 1 denotes the car axle, to which are connected the supporting wheels 2. The wheels 2 are provided with the usual brake shoes 3 secured to brake beams 4 that are connected to and operated by a brake chain 5, one end of which is connected to and adapted to be wound upon the lower end of a brake winding shaft 6 mounted on the platform of the car and provided with the usual crank handle 7 for manually applying the brake.

In addition to the customary manually operated brake applying mechanism as described above, there is employed an auxiliary brake applying mechanism adapted to be operated by the rotary movement of the car axle to apply the brake shoes 3 to the wheels. The auxiliary brake applying mechanism comprises a sleeve 8, which is loosely mounted upon the axle adjacent to one end thereof and is provided with terminal flanges 9, which form a drum or spool upon which is adapted to be wound a chain 10. The chain 10 projects forwardly around the guide pulley 12 journaled on the under side of the car and is then connected to the main brake chain 5, which runs to the crank shaft on the platform of the car.

On the outer end of the sleeve is pivotally mounted a series of friction clutch devices 13, said devices being preferably in the form of bell-crank levers 14. The outer ends of the levers 14 are turned inwardly and provided with segmental clutch faces 15, which are adapted to frictionally engage a clutch pulley 16 fixedly mounted upon the axle of the car. There may be any suitable number of clutch levers 14, four of the same being here shown and preferably employed, said levers being pivotally mounted in any suitable manner at diametrically opposite points on the outer end of the sleeve 8 which is here shown as provided with slots, in which the inner ends of the levers work. The inner ends of the levers 14 are preferably curved outwardly and are adapted to be engaged by the beveled outer end of a cylindrical operating block 17, which is slidably mounted on the sleeve 8 between the drum or chain spool and the inner ends of the levers 14.

The block 17 may be engaged with the inner ends of the levers 14 in any suitable manner, but is here shown and is preferably actuated by a yoke 17ª carried by one end of a shifting lever 18 pivotally mounted on a suitable hanger 18ª on the under side of the car and adapted to engage an annular groove 19 in said block. The other end of the shifting lever 18 is connected to an operating shaft 20 arranged on the platform of the car, by a suitable connecting rod 21. The shaft 20 is provided with a handle 22, by means of which the same is turned to operate the shifting lever and apply the block 17 to the bell-crank clutch levers, which will be thereby frictionally engaged with the friction pulley 16 on the axle. When the clutch levers 14 are thus applied to the pulley 16, said levers and the sleeve 8 will be locked to the axle and turned thereby, thus winding up the auxiliary brake chain 10 on the drum of the sleeve causing the same to draw upon the main brake chain 5 and thus operate the brake beams 4 to apply the brake shoes 3 to the wheels.

By the use of an auxiliary brake applying mechanism such as herein shown and described, the car brakes may be automatically operated by the movement of the car axles without interfering with the ordinary braking mechanism of the car, which if desired may also be simultaneously operated with the auxiliary mechanism.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. An auxiliary braking mechanism for railway cars comprising a sleeve loosely mounted upon one of the car axles, a chain winding drum formed on said sleeve, an auxiliary brake chain connected to the main brake chain of the car and adapted to be wound upon said drum, and means whereby said sleeve is locked to the car axle and turned thereby to wind up said auxiliary chain, thus drawing upon the main brake chain and applying the brake, substantially as described.

2. An auxiliary braking mechanism for railway cars comprising a sleeve loosely mounted upon one of the car axles, a winding drum arranged on said sleeve, an auxiliary brake chain connected to the main brake chain of the car and adapted to be wound upon said drum, a clutch pulley fixedly mounted on the axle of the car, friction clutch levers pivotally mounted on said sleeve, a block adapted to be applied to said levers to frictionally engage the same with said clutch pulley, and means whereby said block is shifted into and out of engagement with said levers, substantially as described.

3. An auxiliary brake applying mechanism for railway cars comprising a sleeve loosely mounted on one of the car axles, a winding drum arranged on said sleeve, a clutch pulley fixedly mounted on said axle, bell-crank clutch levers pivotally mounted on said sleeve, a block adapted to be applied to said levers to frictionally engage the same with said clutch pulley, a shifting lever connected to said block, an operating shaft arranged on the car platform, and means to connect said shaft with said shifting lever to operate the same, substantially as described.

In testimony whereof I have hereunto set my hand in presence of two subscribing witnesses.

CHARLES FERO, Jr.

Witnesses:
   JAS. DONNELLY,
   MARY BEDARD.